United States Patent
Halan et al.

(10) Patent No.: US 9,594,824 B2
(45) Date of Patent: Mar. 14, 2017

(54) PROVIDING A VISUAL AND CONVERSATIONAL EXPERIENCE IN SUPPORT OF RECOMMENDATIONS

(71) Applicant: International Business Machines Corporation, Armonk, NY (US)

(72) Inventors: Shivashankar Halan, Gainesville, FL (US); Joshua W. Hui, Santa Jose, CA (US); Holger Kache, Munich (DE); Eser Kandogan, Mountain View, CA (US); Anshu N. Jain, Sunnyvale, CA (US); Tessa A. Lau, Redwood City, CA (US); Mary A. Roth, San Jose, CA (US); Peter M. Schwarz, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 14/313,000

(22) Filed: Jun. 24, 2014

(65) Prior Publication Data

US 2015/0370890 A1    Dec. 24, 2015

(51) Int. Cl.
G06F 17/30 (2006.01)
G06Q 30/02 (2012.01)

(52) U.S. Cl.
CPC .. *G06F 17/30604* (2013.01); *G06F 17/30029* (2013.01); *G06Q 30/02* (2013.01)

(58) Field of Classification Search
CPC ......... G06F 17/30572; G06F 17/30867; G06F 17/60; G06F 3/0481; G06F 17/30312; G06F 17/30528

See application file for complete search history.

(56) References Cited

U.S. PATENT DOCUMENTS

| | | | |
|---|---|---|---|
| 8,166,016 B2* | 4/2012 | Higgins | G06F 17/30867 707/706 |
| 2005/0182774 A1 | 8/2005 | Weir et al. | |
| 2006/0184410 A1 | 8/2006 | Ramamurthy et al. | |
| 2009/0172689 A1* | 7/2009 | Bobak | G06F 9/5061 718/104 |
| 2010/0049538 A1* | 2/2010 | Frazer | G06Q 30/02 705/14.4 |
| 2010/0161600 A1* | 6/2010 | Higgins | G06F 17/30867 707/736 |

(Continued)

OTHER PUBLICATIONS

Bobrow, et al.: "Dimensions of Representation"; Xerox Corporation; IPCOM000128901D; Dec. 31, 1975; pp. 24.

(Continued)

*Primary Examiner* — Angelica Ruiz
(74) *Attorney, Agent, or Firm* — Cantor Colburn

(57) ABSTRACT

The mapping system and method comprises receiving a query identifying a source entity, the source entity being of a first entity-type; generating a plurality of candidate entities from an analysis of an entity-relationship graph in response to the query based on the source entity; and computing feature values for each candidate entity of the plurality of candidate entities by passing the source entity and the plurality of candidate entities to a type-specific entity recommender particular to the first entity-type.

20 Claims, 6 Drawing Sheets

(56) References Cited

U.S. PATENT DOCUMENTS

| | | | | |
|---|---|---|---|---|
| 2011/0112976 A1* | 5/2011 | Ryan | ................... | G06Q 50/01 |
| | | | | 705/319 |
| 2011/0282888 A1* | 11/2011 | Koperski | .......... | G06F 17/30864 |
| | | | | 707/752 |
| 2012/0084292 A1* | 4/2012 | Liang | ............... | G06F 17/30899 |
| | | | | 707/741 |
| 2012/0109966 A1* | 5/2012 | Liang | ............... | G06F 17/30643 |
| | | | | 707/740 |
| 2012/0330869 A1* | 12/2012 | Durham | ................ | G06N 5/022 |
| | | | | 706/16 |
| 2014/0019471 A1* | 1/2014 | Linton | .................... | G06N 5/02 |
| | | | | 707/759 |
| 2014/0214850 A1* | 7/2014 | Liang | ............... | G06F 17/30873 |
| | | | | 707/740 |

OTHER PUBLICATIONS

Song et al.: "Dynamic Profiling for Efficiency Searching System in Distributed Computing", Dept. of Information Engineering, INHA University; 2010; Berlin; pp. 518-525.

* cited by examiner

PROVIDING A VISUAL AND CONVERSATIONAL EXPERIENCE IN SUPPORT OF RECOMMENDATIONS

BACKGROUND

The disclosure relates generally to providing recommendations, and more specifically, to computing recommendations based on an entity-relationship graph.

In general, a recommendation system produces a ranked list of recommendations, such as movie, product, and/or book recommendations, by modeling a user's past behavior in association with the behavior of similar users and/or items of interest and by applying collaborative, content-based, and hybrid filtering algorithms. Often such systems assume an application domain having a limited number of entity types (e.g., Person, Product) and simple entity interactions (e.g., Person <purchased> Product, Person <rated> Product) that enable the ranked list of recommendations to be generated by these filtering algorithms. Thus, when more complex application domains that include a large number of entities and complex interactions are utilized by the system, the above filtering algorithms fail to adequately represent the interactions between the entities, and in turn yield unsatisfactory recommendations.

For example, a complex application domain may include a plurality of entity types (e.g., User, Task, Platform, System, Component, Log, Event, etc.) that are involved in a plurality of complex interactions (e.g., User <logins> System, System <uses> Component, Component <interfacesTo> Component, etc.) where the plurality of entity types and complex interactions represent collaborative, semantic, and schematic metadata. Collaborative metadata represents complex interactions between user-related entity types, such as, Person, Project, Organization, etc. (e.g., Person <collaboratesWith> Person, Person <worksOn> Project). Semantic metadata represents complex interactions between the content of entity types such as, Table, Column, etc. (e.g., Column <relatedTo> Column, Table <relevantTo> Topic). Schematic metadata represents complex interactions between structural data-related entity types, such as, DataSet, Table, Column, etc. (e.g., DataSet <consistsOf> Table, Table <consistsOf> Column, etc.). To make meaningful recommendations in the complex application domain example, the filtering algorithms must collectively consider each different kind of metadata. Yet the above filtering algorithms fail to consider each different kind of metadata and thus inadequately represent the plurality of interactions—which in turn yields unsatisfactory recommendations.

SUMMARY

According to one embodiment of the present invention, a mapping system and method comprises receiving a query identifying a source entity, the source entity being of a first entity-type; generating a plurality of candidate entities from an analysis of an entity-relationship graph in response to the query based on the source entity; and computing feature values for each candidate entity of the plurality of candidate entities by passing the source entity and the plurality of candidate entities to a type-specific entity recommender particular to the first entity-type.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
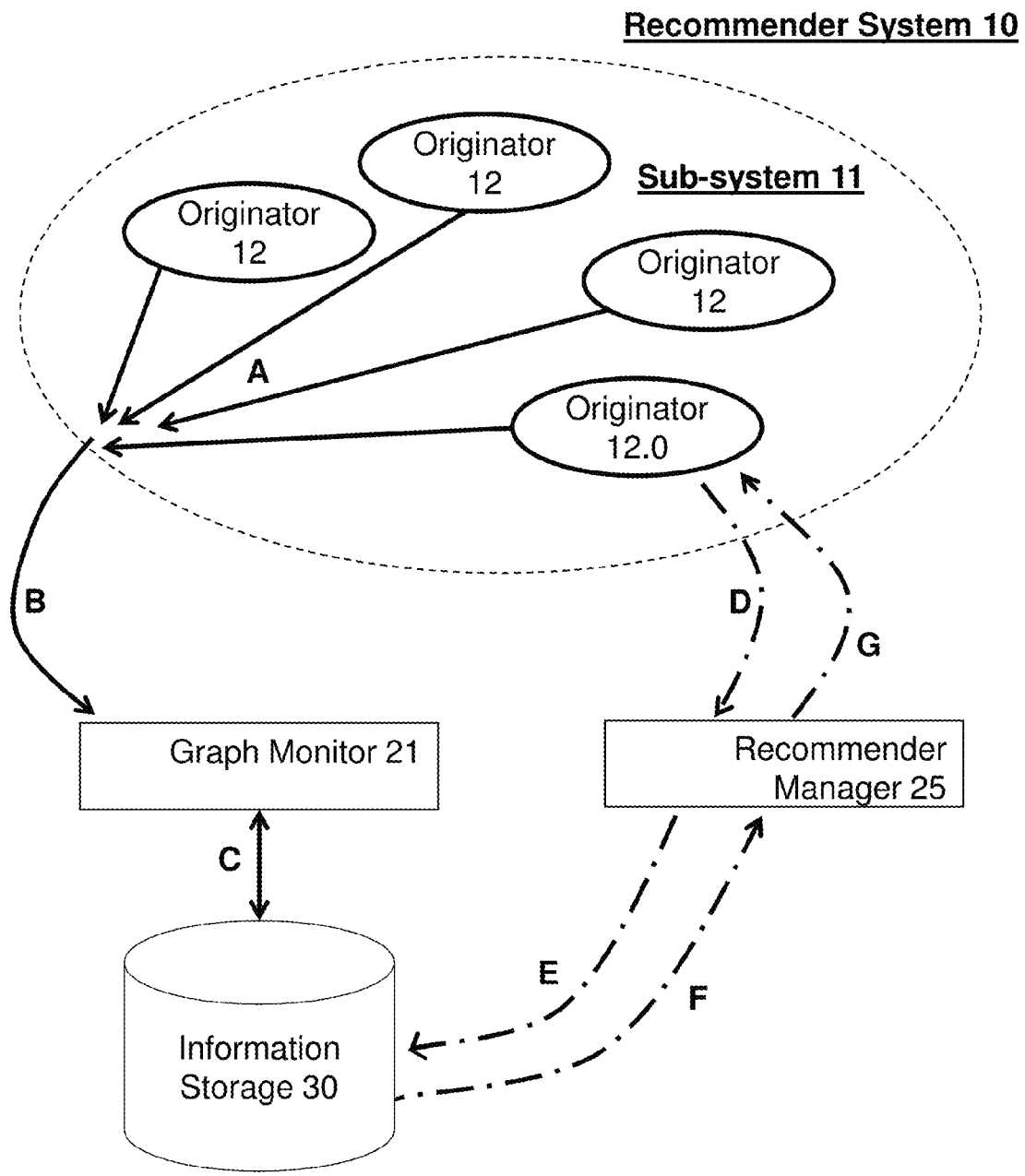
FIG. 1 illustrates a recommender system.

As indicated above, when systems utilize complex application domains that include a large number of entity types and complex interactions, the above filtering algorithms fail to adequately represent the interactions between the entities, and in turn yield unsatisfactory recommendations. Thus, what is needed is an approach for efficiently, flexibly, and accurately providing recommendations within a system that utilizes complex application domains.

In general, embodiments of the present invention disclosed herein may include a recommender system, method, and/or computer program product that builds a graph based on how users interact with the recommender system, method, and/or computer program product and make recommendations based on the graph properties. That is, the recommender system, method, and/or computer program product represents interactions in a complex application domain based on collaborative, semantic, and schematic metadata in graphical form and leverages the collaborative, semantic, and schematic metadata within the graphical form to make recommendations. By making recommendations in this way, the recommender system, method, and/or computer program enables users to remain connected and aware of each other's behavior and/or items of interest, while enabling the users to collaboratively drill down and explore the graphical form from a user interface with no direct user programming.

For example, the mapping system and method comprises receiving a query identifying a source entity, the source entity being of a first entity-type; generating a plurality of candidate entities from an analysis of an entity-relationship graph in response to the query based on the source entity; and computing feature values for each candidate entity of the plurality of candidate entities by passing the source entity and the plurality of candidate entities to a type-specific entity recommender particular to the first entity-type.

Systems and/or computing devices, such as the recommender system (e.g., recommender system 10 of FIG. 1 and computing device 300 of FIG. 3 below), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In general, computing devices may include a processor (e.g., a processor 302 of FIG. 3) and a computer readable storage medium (e.g., a memory 304 of FIG. 3), where the processor receives computer readable program instructions, e.g., from the computer readable storage medium, and executes these instructions, thereby performing one or more processes, including one or more of the processes described herein (e.g., a process of providing recommendation based on an entity-relationship graph).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the recommender system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the recommender system and method.

FIG. 1 illustrates the recommender system 10 comprising a sub-system 11 that includes originators 12 (e.g., a computing device operated by a user, where each operation may create an event), a graph monitor 21, a recommender manager 25, and information storage 30 and is configured to enable a process of providing recommendations based on an entity-relationship graph. That is, the recommender system 10 and components therein may include and/or employ any number and combination of computing devices and networks utilizing various communication technologies, as described above, that enable representing interactions in a complex application domain in graphical form and leveraging structural, semantic, and statistical features of the graphical form to make recommendations.

The recommender system 10 (e.g., the recommender system, method, and/or computer program as described above) utilizes the entity-relationship graph to compute a set of recommended entities from a plurality of entities given a source entity and desired recommended entity-type. The entity-relationship graph is stored as a graph repository that allows querying and the like by recommender system 10 and may also represent entities, data, and metadata of the recommender system 10 in a visual way that enables analytic exploration of the recommender system 10. Further, the entity-relationship graph is a set of points and edges, where the set of points represent a plurality of entities and the edges represent relationships/interactions between the set of points and contain properties/attributes. Entities are objects within a domain of the recommender system 10 that are identified by at least one entity type and may include but are not limited to people, datasets, sources, organizations, components, solutions, etc. Entity types are categories for identifying entities and may include but are not limited to Person, Project, Organization, Visualization, Table, Column, etc. The visualization of the entities, the data, and the metadata of the recommender system 10 by the entity-relationship graph enables users to browse interactions between entities, navigate/traverse particular (or a set of) entities, select/configure an entity, and examine the provenance of data and metadata, along with enabling the performance of aggregations and filters on such data and metadata thereby yielding different perspectives (e.g., supports a natural language interface by which the users may submit queries to search the graphical form).

In operation, the originators 12 of the sub-stem 11 communicate (e.g., arrows A, B) entity and relationship events that include data and metadata to the graph monitor 21. Further, in response to receiving the entity and relationship events, the graph monitor 21 builds and updates the entity-relationship graph from the received entity and relationship events and stores the entity-relationship graph in the information storage 39 (e.g., arrows C). At any time the recommender manager 25, in response to receiving (e.g., arrow D) a recommendation request from the originator 12.0, communicates (e.g., arrows E, F) with the information storage 30 so as to analyze the entity-relationship graph and to generate a plurality of ranked entities that are provided (e.g., arrow G) to the originator 12.0.

The recommender system 10 and elements therein may take many different forms and include multiple and/or alternate components and facilities. While an example of a recommender system 10 is shown in FIG. 1, the components illustrated in FIG. 1 are not intended to be limiting. Indeed, additional or alternative components and/or implementations may be used.

The sub-system 11 and components therein (e.g., originators 12) may include and/or employ any number and combination of computing devices and networks utilizing various communication technologies, as described above, that enable the creation and communication (e.g., arrows A, B) of the entity and relationship events by the originators 12. As indicated above, each originator 12 is a computing device operated by a user, where each operation may create an event that is later communicated to the graph monitor 21. The entity and relationship events are created explicitly as a result of direct user interaction and/or implicitly as a side effect of users performing tasks. Originator 12.0 is utilized below to illustrate a recommendation process.

The graph monitor 21 tracks the entity and relationship events, and runs indexers or collectors that utilize the entities, the data, and the metadata to build indexes and update statistics of the entity-relationship graph in accordance with node and path indexes. The graph monitor 21 may be a part graph sub-system of the recommendation system 10 that provides a graph application programmable interface, which directly updates the entity-relationship graph based on any graph modifier (e.g., upon notification of any event/change occurred in the graph. The node and path indexes and the collected graph statistics of the entity-relationship graph are used by various recommenders (e.g., entity-type specific recommenders) of the recommender manager 25, when a recommendation is requested.

The recommender manager 25 utilizes a plurality of entity-type specific recommenders to analyze the entity-relationship graph in response to the recommendation request on a source entity and/or a set of context entities related to the source entity (e.g., the recommender manager 25 uses the entity-relationship graph to understand the relationship between data, people, and analytics and their underlying semantic underpinnings, and adjust interpretation of the queries and recommendations accordingly). Each entity-type specific recommender may be built on a different set of features, such as graph-statistics-based features, graph-structure-based features, graph-semantics-based features; and a combination of graph-statistics-, structure-, and semantics-based features. Examples of graph-statistics based features include counts of related entities (e.g., number of tables published by a data source) and graph-structure based features include distance between two entities (e.g., distance between a source Query node, and a candidate Table node), while graph-semantics based features relate to the path between the source and candidate nodes (e.g., Person <collaboratesWith> Person <followedBy> Person <downloaded> Table <publishedAt> DataSource). The recommender manager 25, based on the analyzing of the entity-relationship graph, provides recommended entities responsive to the recommendation request. The recommended entities may then be evaluated by the user and accordingly the plurality of entity-type specific recommenders may be updated based on the evaluations, such as when a recommended entity provided by an entity-type specific recommender is approved by a user implicitly or explicitly then that entity-type specific recommender utilizes the approval in subsequent recommendations.

The information storage 30 stores and manages the entity and relationship events that include the data and metadata, such as collaborative, semantic, and schematic metadata.

Figure 2:
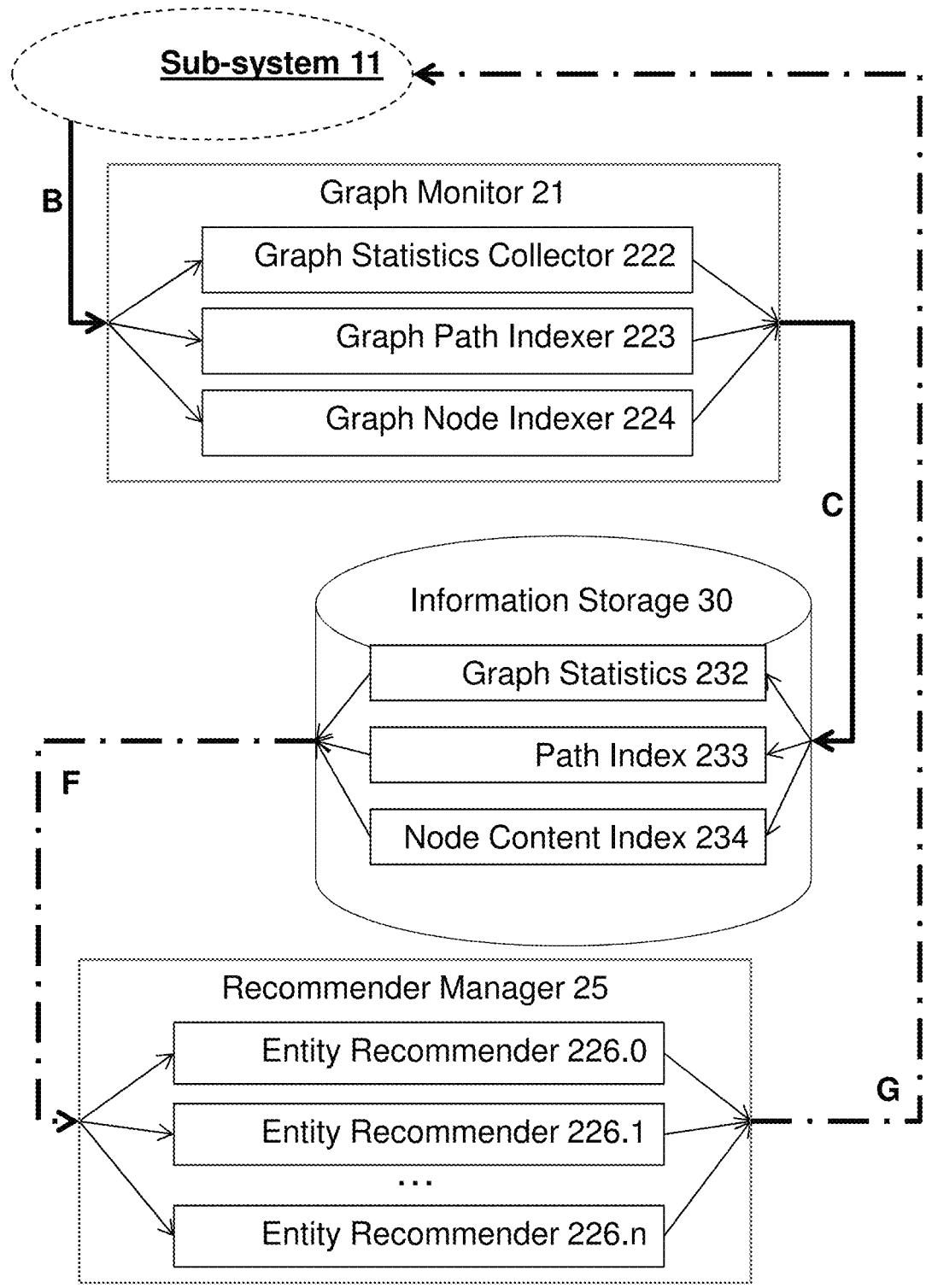
FIG. 2 illustrates a recommender system.

FIG. 2 illustrates an example of an operation of the recommender system 10 where the entity and relationship events flow between the sub-system 11, the graph monitor 21, the information storage 30, and the recommender manager 25 (e.g., arrows B, C, F) in support of producing the plurality of ranked entities (e.g., arrow G).

As illustrated, the graph monitor 21 includes a graph statistics collector 222, a graph path indexer 223, and a graph node indexer 224; the recommender manager 25 includes a plurality of entity recommenders 226 (e.g., entity recommender 226.0 to entity recommender 226.n, where 'n' is an integer representing a number of entity recommenders of the recommender manager 25); and the information storage 30 includes graph statistics 232, a path index 233 (e.g., hash table), and a node content index 234 (e.g., search index).

The graph monitor 21 utilizes the graph statistics collector 222, the graph path indexer 223, and the graph node indexer 224 to respectively compute the graph statistics 232, the path index 233, and the node content index 234 (e.g., the data and metadata) from the received entity and relationship events (e.g., arrow B) so as to provide efficient access to statistics and other data from the entity-relationship graph, which is then stored (e.g., arrow C) on the information storage 23. Also, the graph monitor 21 operates the graph statistics collector 222, the graph path indexer 223, and the graph node indexer 224 to monitor an existing entity-relationship graph to acquire the graph statistics 232, the path index 233, and the node content index 234. Thus, the graph statistics 232, the path index 233, and the node content index 234 are supplemental data structures that enable simplified access to the entity-relationship graph by the recommender manager 25.

The graph statistics collector 232 is generally configured to gather data, and metadata regarding the entity and relationship events. For instance, the graph statistics collector 232 is configured to run operations over the entity-relationship graph to gather the graph statistics 232 (e.g., discover if there has been an increase or decrease in employees). The graph path indexer 223 and the graph node indexer 224 are generally configured to allows instances of a particular class or struct (e.g., entities of a particular entity type) to be indexed just like arrays. For instance, the graph path indexer 223 identifies registered paths within the entity-relationship graph (e.g., tracks which person is collaborating with other people and who those other people are, along with tracking which people are following other people such that a collaborator's collaborator may be identified).

For example, if the graph monitor 21 receives event data associated with an event, the graph statistics collector 232 will compute from the event data various graph statistics 232, such as graph distance, graph in/out degrees, etc. If the graph monitor 21 receives relationship metadata associated with an event, then the graph path indexer 223 is executed to create/update a path index 233 that maintains a list of paths of interest between entities based on the relationship metadata. If the graph monitor 21 receives node metadata associated with an event, such as a creation, deletion, or update metadata, then the graph node indexer 224 is executed to index metadata of the event with the node content index 234.

The entity recommenders 226 (e.g., entity-type specific recommender) are generally configured to perform information filtering on the entity-relationship graph (e.g., arrow F) so as to predict user preferences that are presented and represented (e.g., arrow G) as the plurality of ranked entities. That is, each entity recommender may be particularly configured to recommend a particular entity type due to the fact that the characteristics that make a good person recommendation are not necessarily the same characteristics that make a good data set recommendation. For example, when the entity recommender 226.0 utilizes graph-statistics-based features, the plurality of ranked entities may prefer or rank a data source with a first number of published tables over a data source with number of published tables that is less than the first number, and/or a person with a second number of collaborators over a person with a number of collaborators less than the second number. Further, when the entity recommender 226.1 utilizes graph-structure-based features, the plurality of ranked entities may prefer or rank a table that has a first graph-distance to a source entity over a table that has a distance that is greater than the first graph-distance, and/or a person that has a second graph-distance to a source entity over a person that has a distance that is greater than the second graph-distance. When the entity recommender 226.2 utilizes graph-semantics-based features, the plurality of ranked entities may prefer or rank a person that collaborates with source Person over persons that do not, a person that collaborates with source Person over persons that follow, and/or a person that is followed by a collaborator of the source Person over persons that do not. Other entity recommenders 226 may include, but are not necessarily limited to, a person recommender, a data set recommender, an application recommender, etc.

Figure 3:
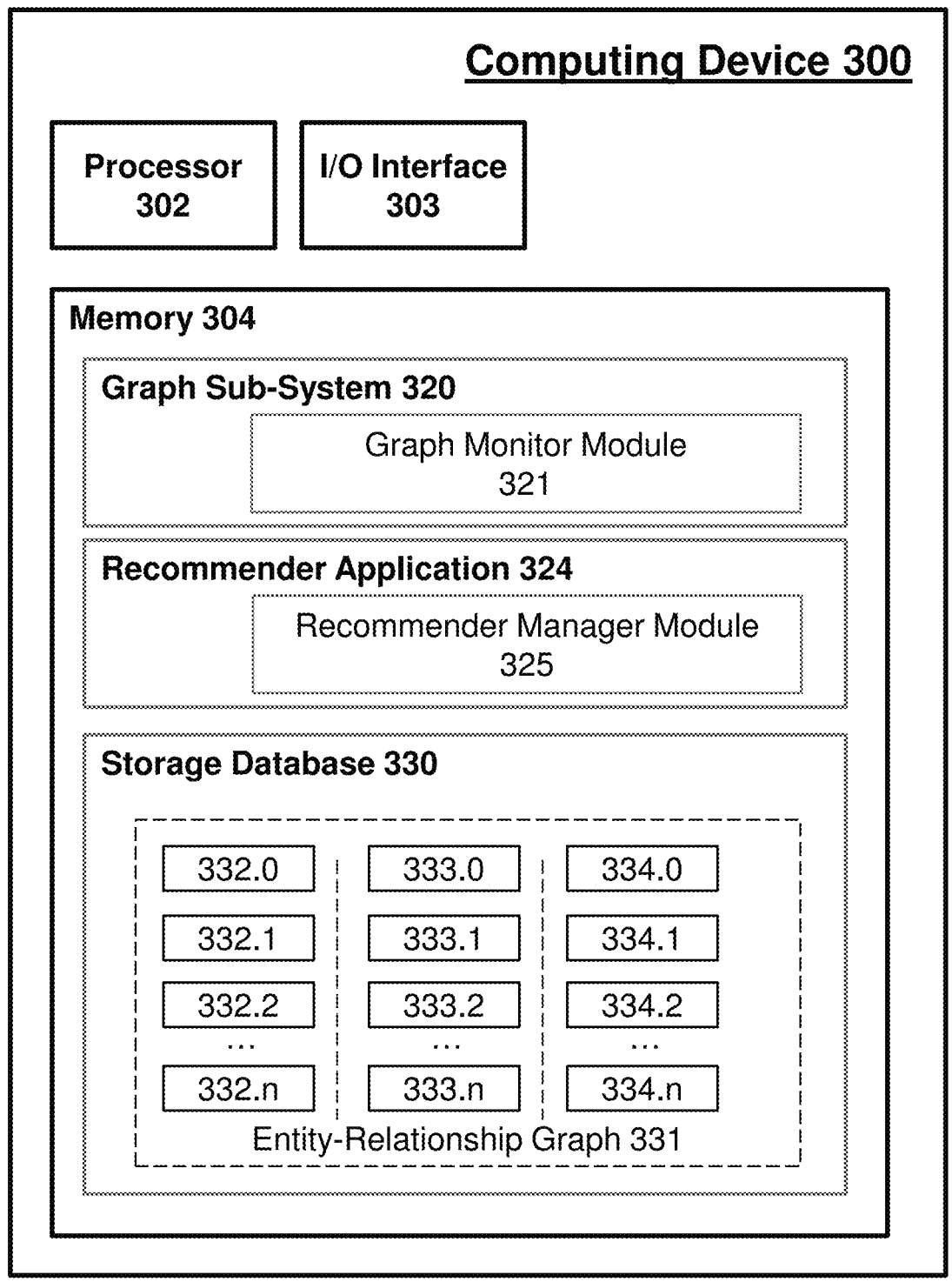
FIG. 3 illustrates a computing device schematic configured to provide recommendations.

FIG. 3 illustrates a computing device 300 (e.g., a computing device as described above) configured to provide a recommendation process that includes a processor 302, an input/output interface 303, and a memory 304. The processor 302 may receive computer readable program instructions from the memory 304 and execute these instructions, thereby performing one or more processes defined by a recommender application 324 of the memory 304.

The processor 302 may include any processing hardware, software, or combination of hardware and software utilized by the computing device 300 that carries out the computer readable program instructions by performing arithmetical, logical, and/or input/output operations. Examples of the processor 302 include, but are not limited to an arithmetic logic unit, which performs arithmetic and logical operations; a control unit, which extracts, decodes, and executes instructions from a memory; and an array unit, which utilizes multiple parallel computing elements.

The input/output (I/O) interface 303 may include a physical and/or virtual mechanism utilized by the computing device 300 to communicate between elements internal and/or external to the computing device 300. That is, the I/O interface 303 may be configured to receive or send signals or data within or for the computing device 300. An example of the I/O interface 303 may include a network adapter card or network interface configured to receive computer readable program instructions from a network and forward the computer readable program instructions, original records, or the like for storage in a computer readable storage medium (e.g., memory 204) within the respective computing/processing device (e.g., computing device 300).

The memory 304 may include a tangible device that retains and stores computer readable program instructions, as provided by the recommender application 324, for use by the processor 302 of the computing device 300. The memory also includes a storage database 300, which stores an entity-relationship graph 331 supported by node and path indexes 333, 334, along with collected graph statistics 332 (e.g., the path index 233, the node content index 234, and the graph statistics 232).

The graph sub-system 320 may include computer readable program instructions configured to represent interactions in graphical form (e.g., create, update, and store the entity-relationship graph 331 via a graph monitor module 321). The graph sub-system 320 enables users to collaboratively navigate and explore the graphical form from a user interface with no direct user programming (as further described below). The graph monitor module 321 (e.g., the graph monitor 21) may include computer readable program instructions configured to track the entity and relationship events via indexers or collectors that utilize the entities, the data, and the metadata to build and update the entity-relationship graph 331 in accordance with node and path indexes 333, 334, along with collected graph statistics 332.

The recommender application 324 may include computer readable program instructions configured to leverage collaborative, semantic, and schematic metadata of the entity-relationship graph to make recommendations (e.g., generate and provide a plurality of ranked entities via a recommender manager module 325). By making recommendations in this way, the recommender application 324 enables users to remain connected and aware of each other's behavior and/or items of interest The recommender manager monitor module 325 (e.g., the recommender manager 25) may include computer readable program instructions configured to utilize a plurality of entity-type specific recommenders to analyze the entity-relationship graph 331 in response to the recommendation request on a source entity and/or a set of context entities related to the source entity (context entities provide context or a reference point for the source entity). While single items are illustrated for the recommender application 324 (and other items) by FIG. 3, these representations are not intended to be limiting and thus, the recommender application 324 and/or items therein may represent a plurality of applications. In addition, although one modular breakdown of the recommender application 324 is offered, it should be understood that the same operability may be provided using fewer, greater, or differently named modules.

Although it is not specifically illustrated in the figures, the graph sub-system 320 and/or recommender application 324 may further include an application programmable interface module and a user interface module; however, these modules may be integrated with any of the above named modules. An application programmable interface module may include computer readable program instructions configured to specify how other modules, applications, devices, and systems interact with each other. A user interface module may include computer readable program instructions configured to generate and manage user interfaces that receive inputs and present outputs. For example, the user interface module may generate and manage an exploratory interface that is a main graphic user interface that users interact/collaborate with in a visual, conversational, and contextual way with the entity-relationship graph. The exploratory interface may further guide the user's thorough analytic tasks by interpreting analytic work statements to find the corresponding data, analytics, visualization, and people from the domain. The exploratory interface leverages recommenders to suggest people to collaborate with, alternative related datasets to explore, useful queries to gain more insight, and potentially useful insights to enrich their understanding of the data and relationships.

Further, the recommender application 324 enables associations between the plurality of entities during the analytic exploration of the entity-relationship graph 331, such associations for example reflecting the semantic relationship between entities by adding new data if user adds a new dataset, person, source, and/or by increasing a weight of the association if such an association already exists. The recommender application 324 allows users to interact via a user interface (e.g., a web interface) with the data and metadata of the entity-relationship graph 331 in natural language queries, in the context of current visual analytic exploration, and responds to the natural language queries with result or a ranked list of datasets and visualizations (e.g., the plurality of ranked entities) with each interaction being presented as a stream of queries and responses that represents a log or history of all of a user's requests.

A query, in general, is an information retrieval activity of obtaining information resources relevant to an information need from a collection of information resources (e.g., the storage database 330). Information retrieval activity initiates searches based on metadata, full-text indexing, and/or other content-based initiators. Thus, for example, the query (arrow D) may initiate or cause the recommender application 324 to perform a recommendation process. Further, a query may be received and/or generated in response to a user input indicating a search for information.

The result (e.g., the ranked list of datasets and visualizations), in general, is a notification mechanism for delivering and/or identifying information targeted by the query (or non-existence of the information) to the user who submitted the query. Examples of notification mechanisms may include, but are not limited to, text messaging (e.g., SMS), audio alerts (e.g., telephone calls, cellphone calls, VoIP calls, voicemails, loudspeaker announcements, etc.), electronic mail (e.g., POP, IMAP, SMTP), desktop alerts (e.g., dialog, balloon, modal window, toast, etc.), pager (e.g., SNPP), instant messaging (e.g., IRC, ICQ, AIM, Yahoo! Messenger, MSN, XMPP, iMessage), and the like. The ranked list of datasets and visualizations includes a best visualization type selected by the recommender application 324 based on data to be presented and existing visualizations in a current visual analytic exploration; a ranked list of persons, sources, components, etc. as recommendations; a list of datasets used in a response to the natural language query and/or a detailed provenance graph of each dataset and transformations applied. The recommender application 324 also allows users to graphically interact with the data and metadata of the entity-relationship graph 331 in a current visualization and interprets a subsequent visualization based on analysis of a user's intent.

In addition, the recommender application 324 provides recommendations to the user by examining all the data and metadata in all visual explorations (by all users), the data and metadata of entities in the current visual exploration, and/or examining the statistical properties (such as correlation) between data and metadata. The recommender application 324 composes new entities by relating and combining the data and metadata from existing entities to the intent of the user's query that are presented to the user as a text response to the user query as part of the stream for the current visual exploration, a visualization of the entities and their associations in the current visual exploration, The and/or markings on visualizations of the entities and their associations. The recommender application 324 also allows the user to share their current and past visual analytic explorations, where invited users are notified about the invitation and allowed to see all (or part) of the queries, system responses, recommendations, and visualizations, to make comments on the queries and system responses, recommendations, and visualizations, and/or to add new queries to the current visual exploration, if specifically allowed to do so.

The storage database 330 (e.g., the information storage 30) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage database 330 may generally be included within a computing device employing a computer operating system such as one of those mentioned above, and are accessed via a network in any one or more of a variety of manners. The storage database 330 is in communication with the recommender application 324 of and/or applications external to the computing device 300, such that information, data structures, and documents including statistics and indexes (e.g., graph statistics 232, a path index 233, and a node content index 234 as described) may be collected and archived in support of the processes described herein (e.g., the process of providing recommendation based on the entity-relationship graph). The storage database 330 may be a part of the recommender system 10, run independently within the same device or system (as illustrated in FIG. 3), or be an external to and in communication with the sub-system 11 (as illustrated in FIG. 1). In operation, for example, the storage database 330 may collect and archive the statistics and indexes (e.g., entity and relationship events) received from sub-system 11. The storage database 330 may further communicate with other systems that may be internal or external to sub-system 11 to collect and archive the statistics and indexes.

As illustrated, the storage database 330 includes graph statistics 332, path indexes 333, and node content indexes 334 (e.g., statistics 332.0 to 332.$n$, indexes 333.0 to 333.$n$, and indexes 334.0 to indexes 334.$n$, where 'n' is an integer representing a number of items archived by the storage database 330. Although one exemplary numbering sequence for the records of the storage database 330 is offered, it should be understood that the same operability may be provided using fewer, greater, or differently implemented sequences.

Figure 4:
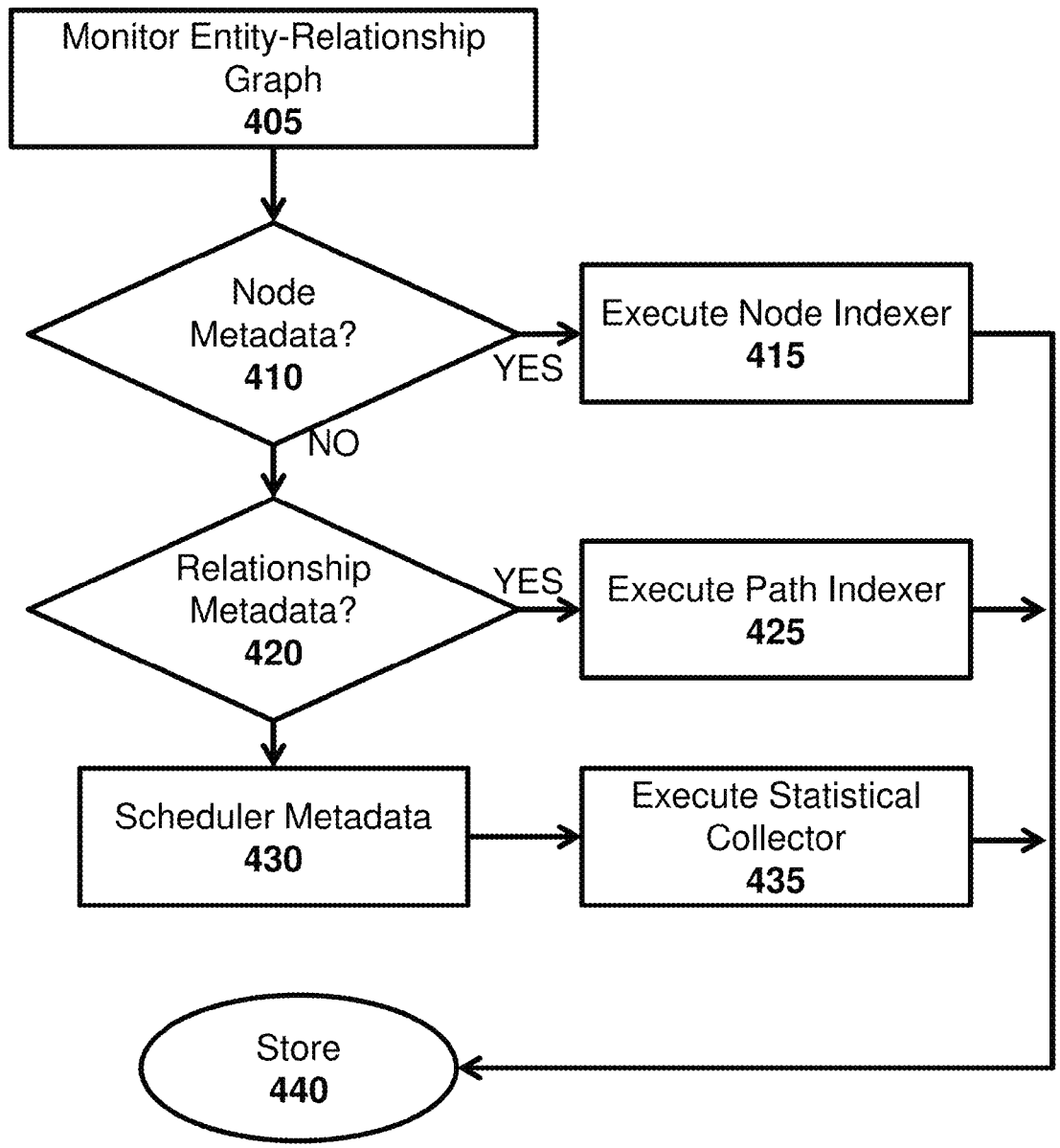
FIG. 4 illustrates a process flow of a recommender system.
Figure 5:
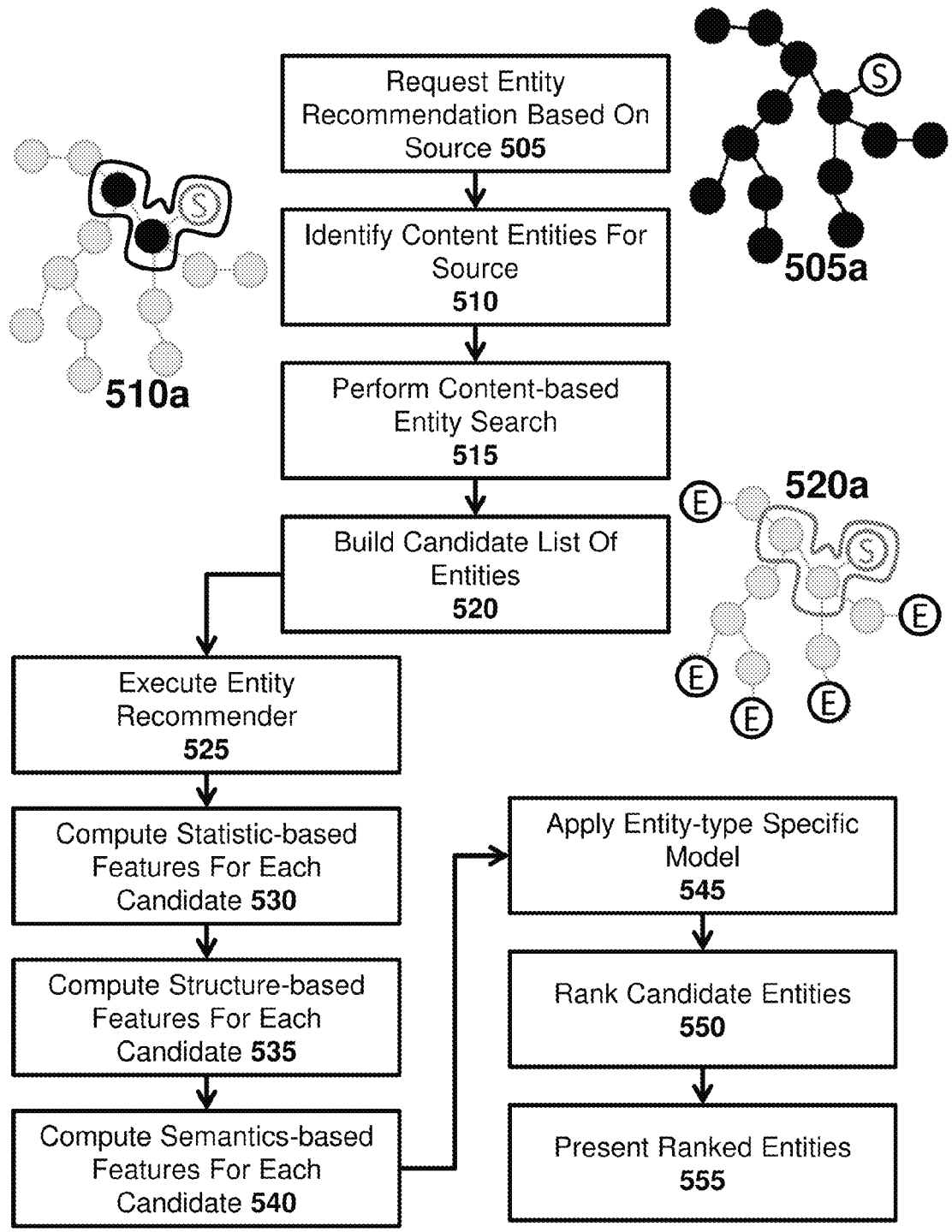
FIG. 5 illustrates a process flow of a recommender system.
Figure 6:
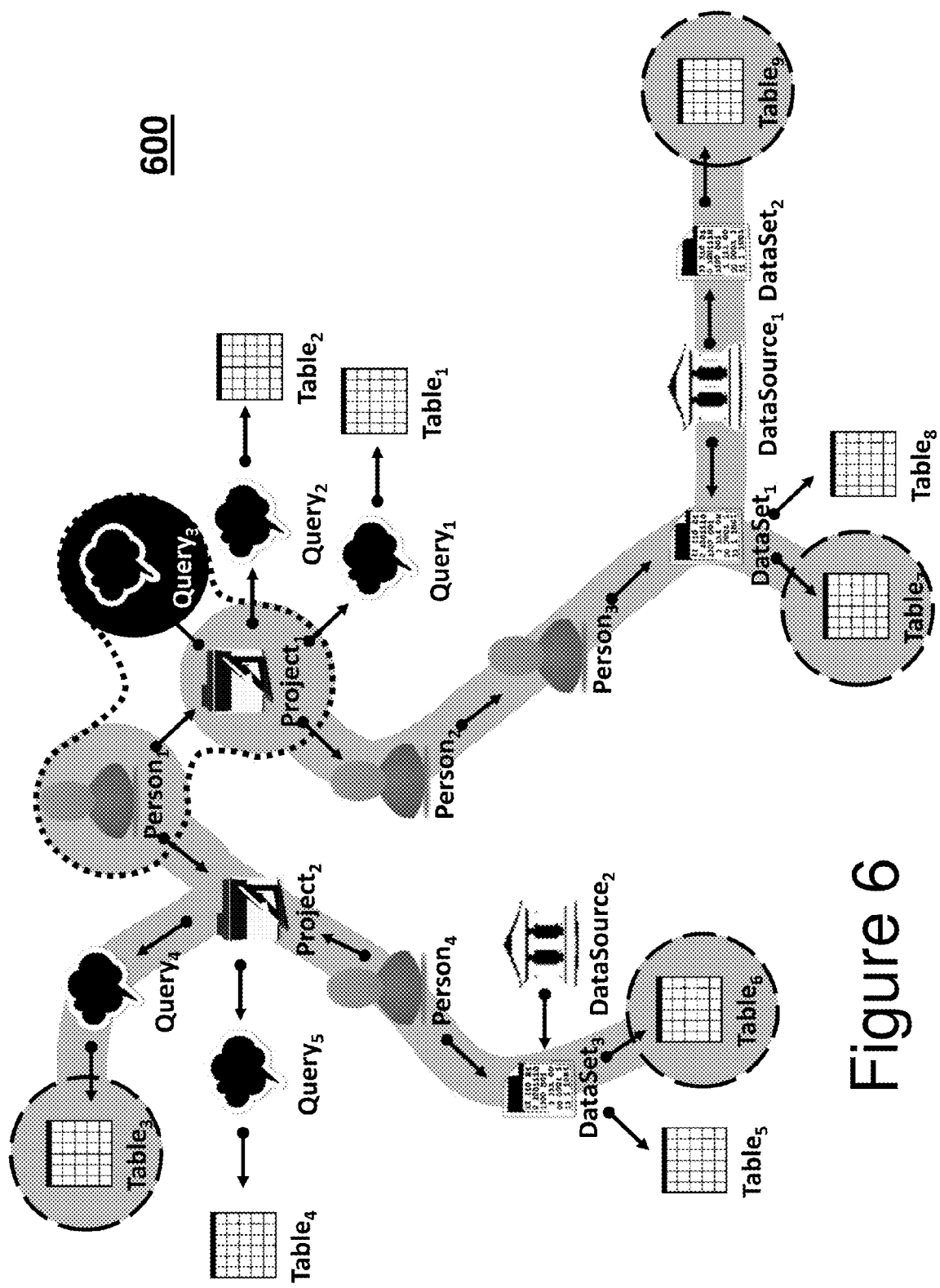
FIG. 6 illustrates an entity-relationship graph.

The graph sub-system 320 and/or recommender application 324 will be described with reference to FIGS. 4-6. FIG. 4 illustrates a process flow 400 of the graph monitor module 321; FIG. 5 illustrates a process flow 500 of the recommender manager module 325; and FIG. 6 illustrates an entity-relationship graph 600 (e.g., the entity-relationship graph 331). The processes 400, 500 illustrate a set of operation blocks (some of which correspond to FIG. 6 via sub-graphs 505a, 510a, 520a) and that are not limiting an order or grouping of operation blocks. In fact, the operation blocks may be executed in sequence, concurrently, or the operation blocks may sometimes be executed in the reverse order, depending upon the operability involved. As illustrated, block 505, block 501, and block 520 correspond to 505a, 510a, 520a, each of which illustrate a different stage of developing and parsing the entity-relationship graph 600.

The process 400 begins at block 405 where the graph monitor 321 monitors the entity-relationship graph to receive new entity and relationship events and/or extract metadata from the entity-relationship graph. Next, at decision block 410, the graph sub-system 320 evaluates whether the received event includes node metadata. If the received event is associated with node metadata (e.g., is a node event), then the process 400 proceeds to block 415 where the received event is passed to an indexer (e.g., the graph node indexer 224) that indexes the node metadata (e.g., generates and/or updates the node content index 234). At block 440, the event and the indexed node metadata are then communicated/stored in the storage database 330 within the entity-relationship graph 331 (e.g., arrow C).

If the received event is not associated with node metadata, then the process 400 proceeds to decision block 420 where the graph sub-system 320 evaluates whether the received event includes relationship metadata. If the received event is associated with relationship metadata (e.g., is a relation event), then the process 400 proceeds to block 425 where the received event is passed to an indexer (e.g., the graph path indexer 223) that indexes the relationship metadata (e.g., generates and/or updates the path index 233). At block 440, the event and the indexed relationship metadata are then communicated/stored in the storage database 330 within the entity-relationship graph 331 (e.g., arrow C).

If the received event is not associated with relationship metadata, then the process 400 proceeds to block 430 where the graph sub-system 320 determines that the received event includes scheduler metadata. The process 400 then proceeds to block 435 where the received event is passed to a collector (e.g., the graph statistics collector 232) that computes from the scheduler metadata graph statistics (e.g., generates and/or updates the graph statistics 232). At block 440, the event and the graph statistics are then communicated/stored in the storage database 330 within the entity-relationship graph 331 (e.g., arrow C). For example, the graph statistics 232, the path index 233, and the node content index 234 are utilized to construct the entity-relationship graph 600 of FIG. 6. As illustrated in FIG. 6 by the arrows, Person 1 works on Projects 1-2 and is connected through Projects 1-2 to Person 2-4 and associated Data Sets 1-2, Data Sources 1-3, and Tables 1-9 (e.g., as defined by the graph statistics 232, the path index 233, and the node content index 234). Further, Person 1 issues Queries 1-5 that yield results (e.g., Queries 1-2 discover Tables 1-2) and associate those results to the Projects 1-2 with the entity-relationship graph 600 (e.g., Queries 4-5 respectively associate Tables 3-4).

Once the graph sub-system 320 (e.g., graph monitor 21) builds/updates/stores the entity-relationship graph 321 from the received the entity and relationship events, the recommender application 324 may at any time utilize recommenders to generate a plurality of candidate entities (i.e. entities that are the outcome of the initial search) from an analysis of the entity-relationship graph 331 (e.g., identify a path within the entity-relationship graph 600 to the candidate entity from the Query 3 so that each candidate entity may be selected and ranked). That is, the process 500 begins at block 505 when the recommender manager module 325 receives (e.g., arrow D) a recommendation request from the originator 12.0, where the recommendation request includes a request for entity recommendation based on a source (e.g., a source entity S of entity-relationship graph 505a). At block 510, the recommender application 324 identifies content entities related the source (e.g., solid black circles included in a dashed-line entity-relationship graph 510a). The process 500 proceeds to block 515 where the recommender application 324 performs a content-based entity search.

For example, if the source entity is a Query as illustrated in FIG. 6 (e.g., an entity-relationship graph 600 illustrates the source entity S as 'query 3') and desired recommended entity-type is Table, the recommender manager module 325 requests the Table Recommender to perform a recommendation with the said Query entity as the source entity. Next, the recommender application 324 builds a set of entities that serve as context to the requested source entity for the recommendation, where the content entities depend on the type of the source and desired recommended entity. That is, as illustrated in FIG. 6, the entity-relationship graph 600 illustrates the content entities related to the source as 'person 1' and 'project 1' included in a dashed-line. In this case, because the source entity is of type Query, possible context could include a Person entity issuing the Query, the Project in which the Query is issued, etc. Following this a content-based entity search is initiated over all the entities of the desired recommended entity type, where the outcome of which is a set of candidate entities.

At block 520, the recommender application 324 builds a candidate list of entities (e.g., candidate entities E of entity-relationship graph 520a). Next the source entity, context entities, and candidate entities are passed to the type-specific entity recommender to compute a set of features. That is, the recommender application 324 executes an entity recommender, at block 525, to evaluate the features of each candidate entity with respect to the source and context entities and to calculate a value for each evaluated feature (e.g., feature values).

In turn, at block 530, the entity recommender computes statistic-based features for each candidate entity (e.g., evaluate a size of the entity-relationship graph with respect to each candidate entity); at block 535, the entity recommender computes structure-based features for each candidate entity (e.g., evaluate a distance over the entity-relationship graph with respect to each candidate entity); and at block 540, the entity recommender computes semantics-based features for each candidate entity (e.g., evaluate a path over the entity-relationship graph with respect to each candidate entity to identify collaborators). Once all these features are computed, they are normalized. For example, if the desired recommended entity is of an-entity type of Person (e.g., employees of an organization), then the entity recommender may compute for each candidate entity the graph-statistic based features of organization size with respect to a number of employees within the organization, the structure-based features of distance between each candidate entity and the source entity, and the semantics-based features of collaborators with respect to employees along a path over the entity-relationship graph from the source entity. As illustrated in FIG. 6, the number of employees is four (e.g., Persons 1-4); the distance between Person 1 and Person 2 is two hops, the distance between Person 1 and Person 3 is three hops, and the distance between Person 1 and Person 4 is two hops; and Persons 2-3 are co-collaborators on Project 1 with Person 1, while Person 4 collaborates with Person 1 on Project 2.

The process 500 then proceeds to block 545, where the recommender application 324 applies an entity-type specific model, which computes an aggregated score combining all of the feature scores of each candidate entity. At block 550, the recommender application 324 ranks the candidate entity, e.g., by the aggregate score, to generate a plurality of ranked entities. For example, the aggregate score may be affected by the feature scores such that Table 7 is ranked higher than table 9 due to the shorter path distance; Table 9 is ranked higher than Table 6 due to the association with Project 1; and Table 6 is ranked higher than Table 3 due to the a recent nature or timestamp of Table 6 despite the disparity in distance. At block 555, the recommender application 324 presents the plurality of ranked entities as the recommendation to the originator 12.0 or, for example, to the user.

Thus, in complex domains as described above it makes sense to represent these interactions in the form a graph so that the recommender system leverages graph structural, semantic, and statistical features to make recommendations over an entity-relationship graph. The advantage of using an entity-relationship graph over a relational table is that it can adequately represent the complex interactions between the entities and leverage them in ranking recommendations. For example, consider the domain on analytic work. To make suitable recommendations for a data table one has to take into account all the context of the problem, i.e. the path between a Query entity and a candidate Table entity, the path between a Person who issued the Query and candidate Table entity, and the path between the Project in which the Query was executed and the candidate entity. Variations in the path between these entities make a significant difference in ranking the candidate entities. Further, it is generally preferred to recommend a table that a collaborator used in another project (e.g., Person <collaboratesWith> Person <worksOn> Project <issuedIn> Query <uses> Table) over a table that someone who is followed by a collaborator downloaded from a data source (e.g., Person <collaboratesWith> Person <followedBy> Person <downloaded> Table <publishedAt> DataSource).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
   receiving, by a processor implemented recommender manager, a query identifying a source entity, the source entity being of a first entity-type;
   generating, by the recommender manager, a plurality of candidate entities from an analysis of an entity-relationship graph in response to the query based on the source entity;
   computing, by the recommender manager, feature values for each candidate entity of the plurality of candidate entities by passing the source entity and the plurality of candidate entities to a type-specific entity recommender particular to the first entity-type;
   computing, by the recommender manager, an aggregated score for each candidate entity by combining all of the feature values for each candidate entity;
   generating, by the recommender manager, a plurality of ranked candidate entities by ranking each candidate entity in accordance with the computed aggregate score corresponding to that candidate entity to represent complex interactions between the plurality of candidate entities and leverage the complex interactions in the ranking; and
   identifying, by the recommender manager, entity and relationship events that alter the entity-relationship graph by monitoring the entity-relationship graph.

2. The method of claim 1, further comprising:
   presenting the plurality of ranked candidate entities in response to the query.

3. The method of claim 1, wherein each entity recommender of the plurality of entity recommenders corresponds to one of a plurality of entity types.

4. The method of claim 1, wherein the entity-relationship graph is a set of points and edges, the set of points representing a plurality of entities and the edges representing relationships between the set of points.

5. The method of claim 1, further comprising:
   extracting metadata associated with the entity and relationship events and providing the extracted metadata to a storage dataset in response to the identifying the entity and relationship vents that alter the entity-relationship graph.

6. The method of claim 5, wherein when one of the entity and relationship events is a node event, processing the node event by a graph node indexer to index within a node content index metadata associated with the node event of the extracted metadata.

7. The method of claim 5, wherein when one of the entity and relationship events is a relation event, processing the relation event by a graph path indexer to index within a path index metadata associated with the relation event of the extracted metadata.

8. The method of claim 5, wherein when one of the entity and relationship events is a scheduled event, processing the scheduled event by a graph statistics collector to compute graph statistics from metadata associated with the scheduled event of the extracted metadata.

9. The method of claim 5, further comprising:
   leveraging collaborative, semantic, and schematic metadata of the entity-relationship graph during the analysis of the entity-relationship graph.

10. The method of claim 1, wherein the complex interactions include a plurality of entity types being involved in a plurality of interactions that together represent collaborative, semantic, and schematic metadata.

11. A computer program product, the computer program product comprising a non-transitory computer readable storage medium having program instructions embodied therewith, the program instructions executable by a processor to cause:
    receiving, by a processor, a query identifying a source entity, the source entity being of a first entity-type;
    generating, by the processor, a plurality of candidate entities from an analysis of an entity-relationship graph in response to the query based on the source entity;
    computing, by the processor, feature values for each candidate entity of the plurality of candidate entities by passing the source entity and the plurality of candidate entities to a type-specific entity recommender particular to the first entity-type;
    computing, by the processor, an aggregated score for each candidate entity by combining all of the feature values for each candidate entity;
    generating, by the processor, a plurality of ranked candidate entities by ranking each candidate entity in accordance with the computed aggregate score corresponding to that candidate entity to represent complex interactions between the plurality of candidate entities and leverage the complex interactions in the ranking; and
    identifying, by the processor, entity and relationship events that alter the entity-relationship graph by monitoring the entity-relationship graph.

12. The computer program product of claim 11, wherein the program instructions are further executable by the processor to cause:
    presenting the plurality of ranked candidate entities in response to the query.

13. The computer program product of claim 11, wherein each entity recommender of the plurality of entity recommenders corresponds to one of a plurality of entity types.

14. The computer program product of claim 11, wherein the entity-relationship graph is a set of points and edges, the set of points representing a plurality of entities and the edges representing relationships between the set of points.

15. The computer program product of claim 11, wherein the program instructions are further executable by the processor to cause: extracting metadata associated with the entity and relationship events and providing the extracted metadata to a storage dataset in response to the identifying the entity and relationship events that alter the entity-relationship graph.

16. A system, comprising a processor and a non-transitory memory, the system configured to:
    receive a query identifying a source entity, wherein the source entity is a first entity-type;
    generate a plurality of candidate entities from an analysis of an entity-relationship graph in response to the query based on the source entity;
    compute feature values for each candidate entity of the plurality of candidate entities by passing the source entity and the plurality of candidate entities to a type-specific entity recommender particular to the first entity-type;
    compute an aggregated score for each candidate entity by combining all of the feature values for each candidate entity;
    generate a plurality of ranked candidate entities by ranking each candidate entity in accordance with the computed aggregate score corresponding to that candidate entity to represent complex interactions between the plurality of candidate entities and leverage the complex interactions in the ranking; and identify entity and relationship events that alter the entity-relationship graph by monitoring the entity-relationship graph.

17. The system of claim 16, wherein the system is configured to:

present the plurality of ranked candidate entities in response to the query.

18. The system of claim 16, wherein each entity recommender of the plurality of entity recommenders corresponds to one of a plurality of entity types.

19. The system of claim 16, wherein the entity-relationship graph is a set of points and edges, the set of points representing a plurality of entities and the edges representing relationships between the set of points.

20. The system of claim 19, wherein the system is configured to:

extracting metadata associated with the entity and relationship events and providing the extracted metadata to a storage dataset in response to the identifying the entity and relationship events that alter the entity-relationship graph.

* * * * *